United States Patent
Yu et al.

(10) Patent No.: US 6,299,146 B1
(45) Date of Patent: Oct. 9, 2001

(54) RETANGULAR SUSPENDING DOWNCOMER DIRECTING TRAY

(75) Inventors: Xiaomei Yu; Chongsi Xu; Jingzhong Zhu; Ou Li; Zuming Zheng; Kejian Yao; Jun Tian, all of Hangzhou (CN)

(73) Assignees: China Petro-Chemical Corp., Beijing; Zhenjiang University of Tech., Hangzhou, both of (CN)

( * ) Notice: Subject to any disclaimer, the term of this patent is extended or adjusted under 35 U.S.C. 154(b) by 0 days.

(21) Appl. No.: 09/471,054

(22) Filed: Dec. 22, 1999

Related U.S. Application Data

(63) Continuation-in-part of application No. 09/054,080, filed on Apr. 2, 1998, now abandoned.

(30) Foreign Application Priority Data

Apr. 3, 1997 (CN) ................................................ 97103869

(51) Int. Cl.$^7$ ........................................................ B01F 3/04
(52) U.S. Cl. ..................................... 261/114.1; 261/114.3; 261/114.5
(58) Field of Search ................................ 261/94, 96, 97, 261/110, 114.1, 114.3, 114.4, 114.5

(56) References Cited

U.S. PATENT DOCUMENTS

| | | | |
|---|---|---|---|
| 3,062,517 | * 11/1962 | Voetter et al. | 261/114.3 |
| 3,410,540 | * 11/1968 | Bruckert . | |
| 4,174,363 | * 11/1979 | Bruckert | 261/114.5 |
| 4,550,000 | * 10/1985 | Bentham | 261/114.1 |
| 5,098,615 | * 3/1992 | Resetarits | 261/114.3 |
| 5,209,875 | * 5/1993 | Miller et al. | 261/114.1 |
| 5,318,732 | * 6/1994 | Monkelbaan et al. | 261/114.1 |
| 5,382,390 | * 1/1995 | Resetarits et al. | 261/114.3 |
| 5,547,617 | * 8/1996 | Lee et al. | 261/114.4 |
| 5,975,504 | * 11/1999 | Nutter et al. | 261/114.5 |

FOREIGN PATENT DOCUMENTS

1542242-A  *  4/1970 (DE) ................................ 261/114.5

* cited by examiner

Primary Examiner—C. Scott Bushey
(74) Attorney, Agent, or Firm—Anderson, Kill & Olick, P.C.

(57) ABSTRACT

The vapor-liquid contacting tower contains multiple trays having multiple openings and multiple rectangular downcomers with multiple bottom openings. At least a pair of directing slots and at least a pair of directing baffles are installed in the liquid receiving zone of the tray and under the bottom openings of a downcomer of the adjacent overlying tray.

4 Claims, 3 Drawing Sheets

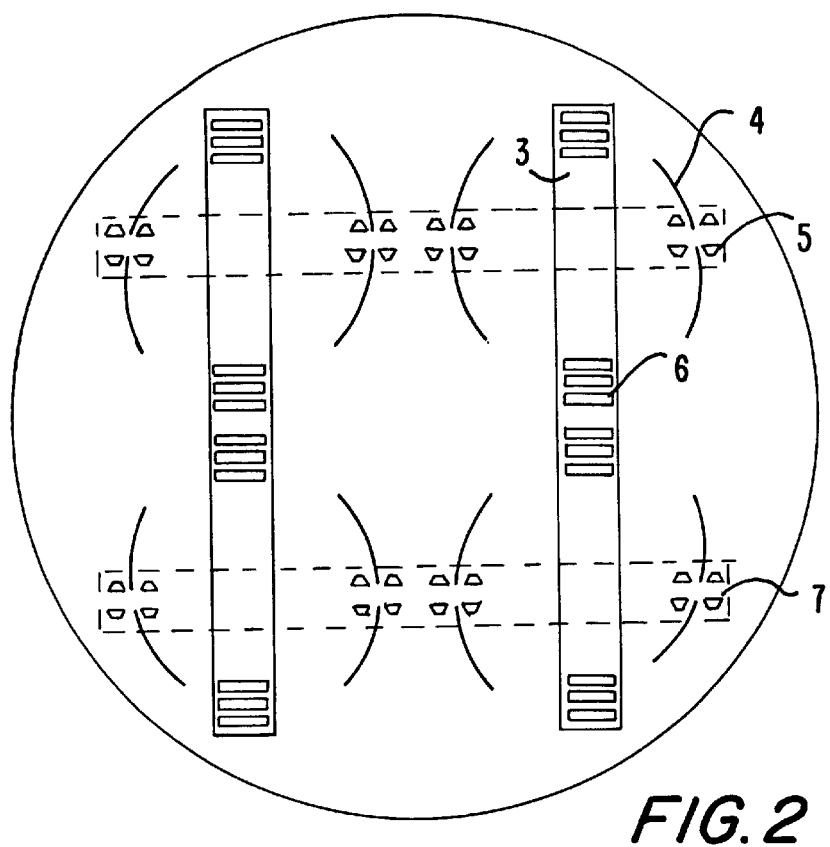
FIG. 2
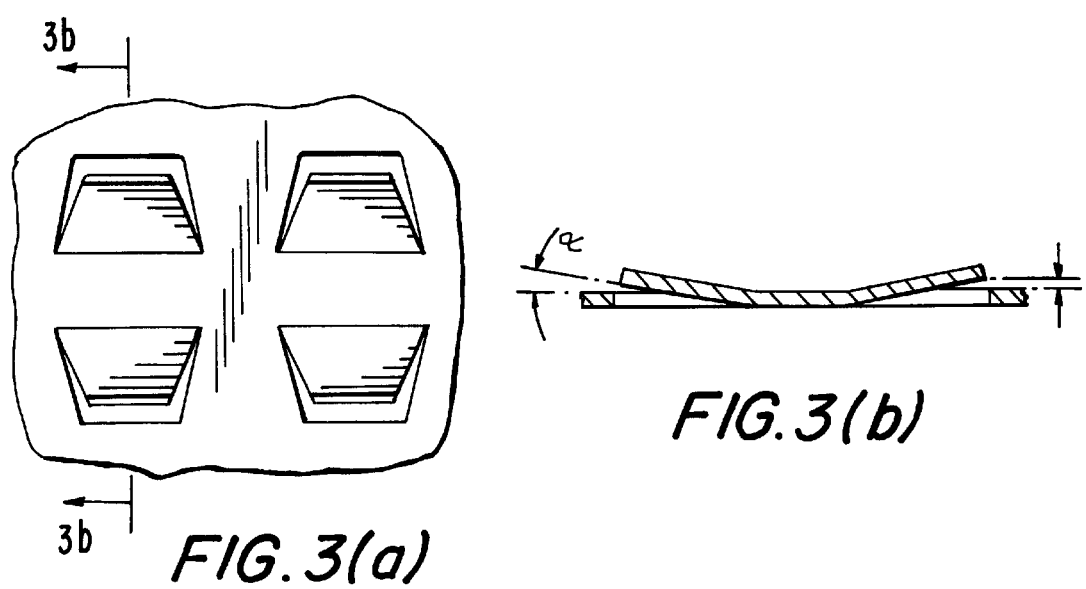
FIG. 3(a)
FIG. 3(b)

RETANGULAR SUSPENDING DOWNCOMER DIRECTING TRAY

This application is a continuation-in-part application of U.S. patent application Ser. No. 09/054,080 filed on Apr. 2, 1998, now abandoned.

FIELD OF THE INVENTION

The present invention relates to an improvement of a rectangular downcomer tray in a vapor-liquid contacting tower. More particularly, it relates to an improvement of a novel rectangular downcomer tray having directing components. Directing components are installed in order to improve the distribution of the liquid flow on the tray, uniform the liquid flow and prevent impact weeping of liquid from the present tray to the adjacent tray below. Therefore, the improve tray can raise the separation efficiency of the tray when used in a vapor-liquid contacting tower.

BACKGROUND ART

At present, most trays in domestic and foreign vapor-liquid mass transfer apparatus use arched downcomers, the overflow periphery of which is only the chord length and the arc of the arch does not function. Therefore, they can not offer great liquid capacity and is not suitable to the operation with high liquid-vapor ratios and under pressures. UCC in USA invented an MD tray (Multiple Downeomer Sieve Tray, U.S. Pat. No. 3,410,540) in 60s, which is a sieve tray using rectangular downcomers. All the four sides of the rectangle are overflow periphery and the overflow weir is 2–5 times longer than that of the arched downcomer, suitable to the operation with great liquid capacity and high liquid-vapor ratios. The downeomer is suspended in the vapor phase space and requires no receiving pan, and therefore the bubbling area can be increased by 10–15%. However, because the liquid flow on the MD tray has to turn for 90 degrees; its path is short and its distribution is less uniform, the tray efficiency is somewhat affected. When a tower is expanded and modified with MD trays, replacement of 3 by 4 or 2 by 3 is usually employed (TECHNOLOGY 1988, June 6, Oil & Gas Journal 54). In recent years, UOP Co. in USA has developed ECMD (enhanced Capacity Multiple Downcomer Sieve Tray)for increasing the width of the downeomer and enhancing the liquid treatment capacity, but no improvement is made in liquid flow distribution on the tray, see CHEMICAL ENGINEERING PROGRESS Vol. 66, No. 3.

U.S. Pat. No. 5,382,390 to Resetarits et al., proposes a multiple downcomer tray with notched directing slots. The directing slot is notched at the middle of the bubbling zone among the downcomers and oriented towards the overflow weir of the tray, i.e., the long side of the downcomer. The object of the slot is to push the liquid half way on the liquid flowing path across the tray and decrease the height of the froth and the entrainment of the droplet so as to enhance the vapor throughput. Resetarits thinks that, unlike the normal cross-flow tray, the multiple downcomer tray exhibits no phenomena of sluggish flow and liquid non-uniform residence time; the liquid flow distribution is already uniform. and thus there is no need to improve the liquid flow distribution. Therefore, notching multiple directing slots and determining their position and direction are all for pushing the liquid half way and enhancing the vapor throughout. The research for evaluating the uniformity of the liquid flow distribution by equivalent residence time distribution curves measured with an optical fiber instrument demonstrates that the liquid on the Resetarits' 390 multiple downcomer tray is injected in point form, and then turned for 90 degrees. Therefore, there exists an obvious non-uniform phenomenon (refer to FIG. 5(a)) for the liquid distribution.

The object of the present invention is therefore to notch directing slots and install directing baffles on the liquid receiving zone into which the liquid just enters so as to improve the initial distribution upon entering the tray, allow the liquid flow to turn for 90 degrees smoothly and distribute as uniformly as possible as shown in FIG. 5(b), and thus enhancing the separation efficiency.

SUMMARY OF THE INVENTION

The present invention provides a vapor-liquid contacting tower, which comprises multiple trays having multiple openings and multiple rectangular downcomers, the trays being positioned along the vertical direction and the rectangular downcomer being arranged in parallel and extending downwards from each tray; the angle between the downcomers on the adjacent two trays being 90 degrees. Each downcomer has multiple openings at its bottom, the end of which is located close to and above the adjacent tray below; the liquid flows downwards onto the liquid receiving zone of the adjacent tray below through the bottom openings of the downcomer, then traverses the tray, and arrives at the overflow weir of the downcomer of the tray. The vapor flows upwards through the openings of each tray, bubbles up through the liquid layer and form a bubbling zone, and thereby mass transfer occurs between the vapor and liquid. The improvement lies in that at least a pair of directing slots and at least a pair of directing baffles are installed under the bottom openings of the downcomer of the adjacent tray above and on the receiving zone of the present ray. The directing slot is tilted and heaved up from the tray and located at the center of the liquid receiving zone; the directing baffle is an arched strip fixed on the tray and locates at the outside side of the directing slot and close to the edge of the liquid receiving zone. The directing slot makes the liquid in the receiving zone split to two sides, turn for 90 degrees by the directing baffles, and thereby the liquid flows across the bubbling zone of the tray more uniformly and steadily.

BRIEF DESCRIPTION OF THE DRAWING

FIG. 2 is a plan view of the directing tray according to the present invention, wherein the distribution of the directing slot and the directing baffle in the liquid receiving zone (7) is shown.

FIG. 3(a) is a magnified view of the structure of the directing slot (5) shown in FIG. 1.

FIG. 3(b) is a cross-sectional view taken along lines 3(b)-3(b) of FIG. 3(a).

DETAILED DESCRIPTION OF THE INVENTION

Figure 1:
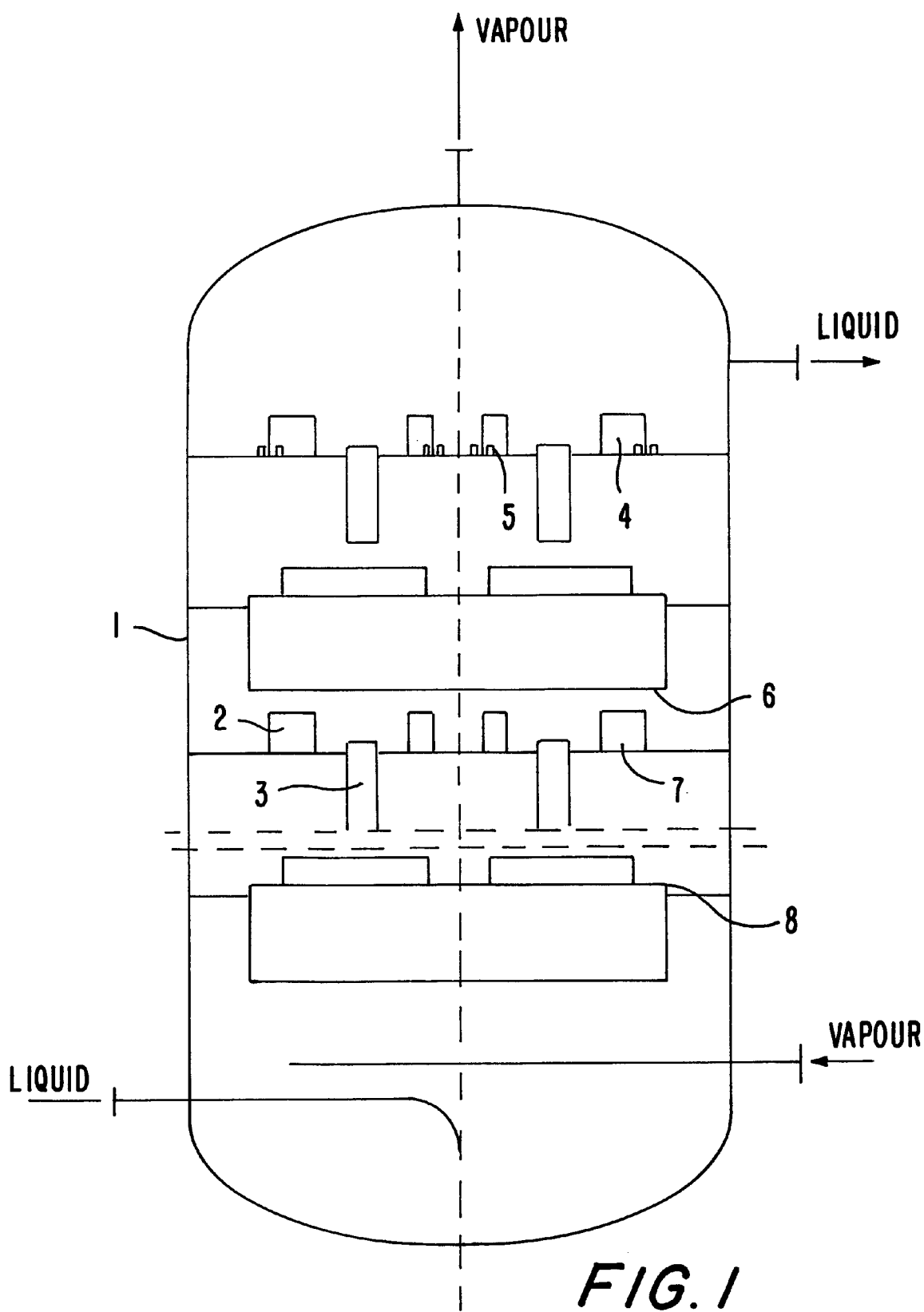
FIG. 1 is a schematic diagram of the vapor-liquid contacting tower equipped with the directing tray structure according to the present invention.

The present is further described with reference to the drawing.

The present invention provides a try structure used in a vapor-liquid contacting tower having rectangular downcomers (FIGS. 1, 2). The tower comprises a tower body (1); multiple trays (2) having multiple openings installed in the tower; each tray having multiple rectangular downcomers (3) extended downwards and arranged in parallel, the angle between the downcomers of the adjacent two trays being 90 degrees; each downcomer has multiple openings (6) at the bottom, the end of which is located close to and above the adjacent tray below; the liquid flows downwards onto the liquid receiving zone (7) of the adjacent tray below through the bottom openings of the downcomer; the liquid flow turns for 90 degrees in the vertical direction first, and then turns for 90 degrees again in the horizontal direction because the angle between the downcomers of the adjacent two trays is 90 degrees, then flows across the tray, and finally arrives at the overflow weir (8) of the present tray and enters the downcomer. The vapor flows upwards through the openings of each tray, bubbles up through the liquid layer and forms a bubbling zone, and thereby mass transfer occurs between the vapor and liquid.

The liquid flows downwards through the bottom openings (6) of each downcomer and forms a liquid receiving zone (7) on the adjacent ray below. The position of the bottom openings of each downcomer may differ and is usually at two sides and the center and each position may have one or several openings in strip, circle or other shapes. The number of the liquid receiving zone on the present tray corresponding to the downcomer bottom of the adjacent tray above is determined by the number of the downcomer. If the number of the downcomer is N, the number of the liquid receiving zone corresponded by each downcomer is 2N, so each tray has $2N^2$ liquid receiving zones. For example, if each tray has one downcomer, there are two liquid receiving zones; if each tray has two downcomers, there are eight liquid receiving zones. These liquid receiving zones are only the starting points of the liquid across this tray, constituting only a small portion of the whole mass transfer bubbling zone of the tray. (FIG. 2).

At least a pair of left and right directing slots (5) is notched at the center of the receiving zone to guide the liquid towards both sides (FIG. 2). The directing slot is tilted and heaved up from the tray and usually is punched rectangular. The directing slot is oriented at 5–15 degrees from the horizontal (FIG. 3). Its mouth points at the directing baffle (4) located at the outer side of the directing slot and close to the edge of the liquid receiving zone so as to guide the liquid which has flowed down towards the directing baffle, and then across the mass transfer bubbling zone uniformly and steadily by the guidance of the directing baffle with a certain curvature, and further to the overflow weir of the downcomer. The notching rate of the directing slot in the liquid receiving zone may be the same as that of the bubbling zone of the tray. The directing slot is a long strip with a slot height h=2–4 mm (FIG. 3b). Bubbling also occurs in the liquid receiving zone, and thereby the bubbling area on the entire tray is enlarged. In addition, the liquid that has flowed through the bottom opening of the downcomer of the adjacent tray above would not directly impact the section of the opening in the present ray because the directing slot is tilted. Therefore, the amount of the impact weeping liquid decreases.

Figure 4A:
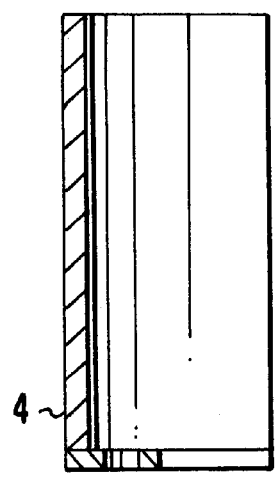
FIG. 4(a) is a cross section view taken along line 4(a)-4(a) of FIG. 4(b).
Figure 4B:
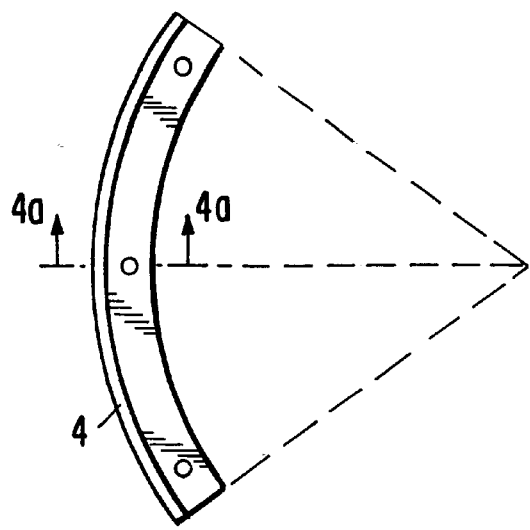
FIG. 4(b) is a top plan view of directing baffle of FIG. 2.

At least a pair of left and right directing baffles (4) of the directing slot so as to liquid receiving zone and facing the notching direction of the directing slot so as to receive the liquid flow guided by the directing slot and turn the liquid flow smoothly for 90 degree (FIG. 2). Directing baffles are arc strips fixed to the tray (FIG. 4). The curvature radius of the arc strip is determined so that it is equivalent to the maximum turning radius when the liquid flows across the tray and turns for 90 degrees. For example, if two downcomers are installed in a tower with a diameter of 2.4 m, the maximum turning radius is 0.4 m when the liquid turns for 90 degree, then the curvature radius of the directing baffle may be taken as about 0.4 m. The height of the directing baffle should be slightly higher than that of the clear liquid layer, which is usually 60–120 mm. Its length depends on the maximum turning radius, usually being 50–300 mm.

Figure 5A:
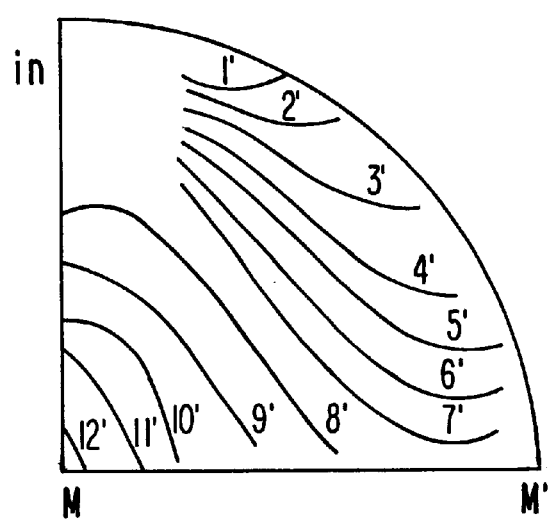
FIG. 5(a) is a prior art distribution of the equivalent mean residence time of the liquid flow on the tray without directing slot and directing baffle.

TEST FOR THE UNIFORMITY OF THE LIQUID FLOW DISTRIBUTION ON THE TRAY (REFER TO FIGS. 5a,b)

Figure 5B:
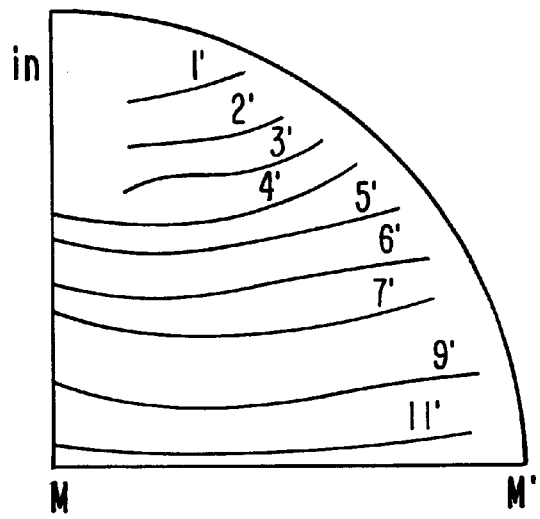
FIG. 5(b) is a distribution of the equivalent mean residence time of the liquid flow on the tray equipped with the directing slot and directing baffle of the present invention.
Figure 1:
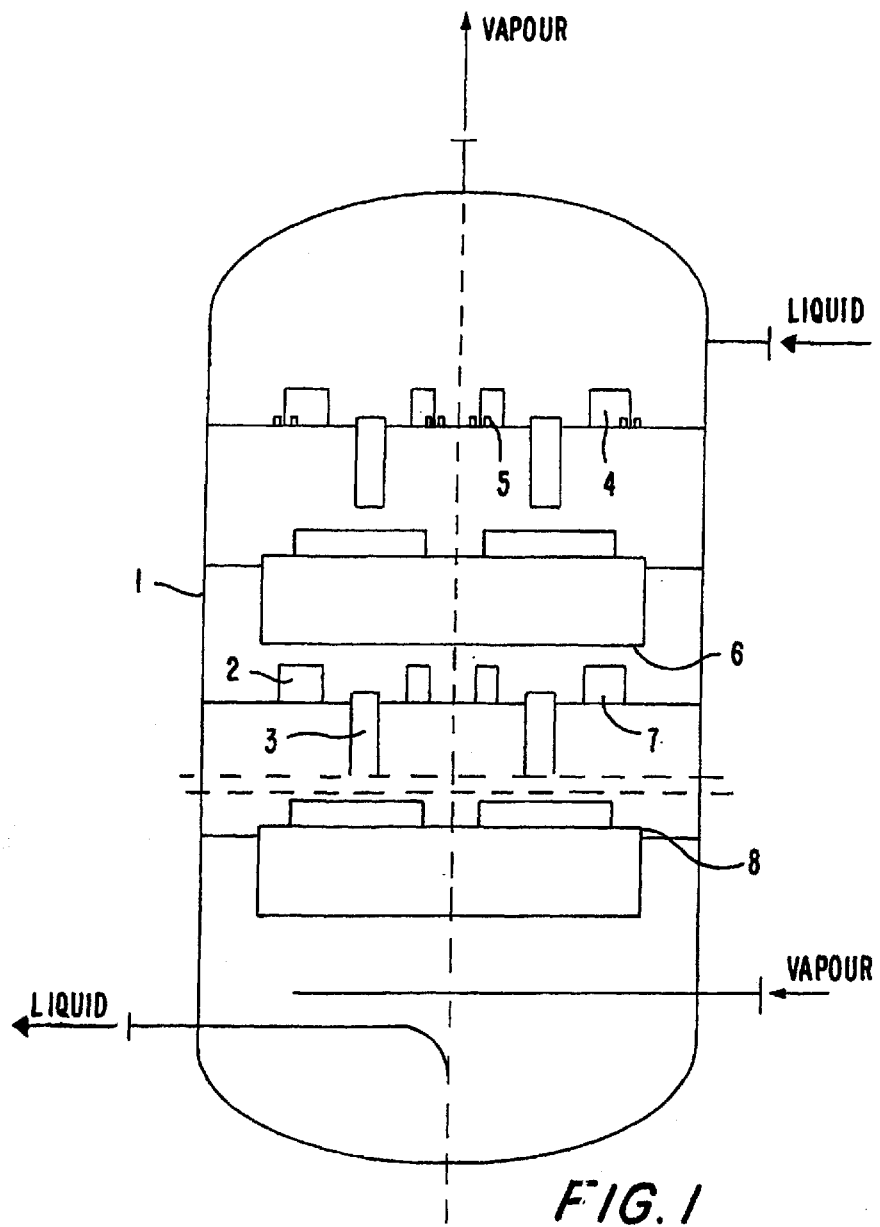

The experiment is accomplished in a test tower with a diameter of 1.2 m using an air-water system. A rectangular downcomer is installed on each of the adjacent trays. The angle between the downcomers of the two adjacent trays is 90 degrees. The liquid receiving zone of the present tray corresponded by the bottom opening of the adjacent tray above locates near the wall in the vertical direction as shown in the figure. The downcomer of the present tray (test tray) locates in the horizontal direction in the figure. Rhodamine 6G was used as a tracing agent and 20 optical fiber probes were installed within the area of a symmetric quarter of the circle. The tracing agent was injected at the outlet of the downcomer bottom in the form of pulses. The light signal measured from the optical fiber probes was converted to the electric signal and this signal versus time was recorded on the instrument. Then a group of equivalent mean residence time distribution curves were obtained through data processing. The numbers on the curves represent the residence time in second. For example, the curve marked by 7' in FIG. 5(a) indicates that the liquid particles with a residence time of 7 seconds are located on this curve. The curves in FIG. 5(a) were obtained when no directing baffle and no directing slot was installed, and the equivalent mean residence time distribution curves were not uniform. In denotes the inlet for the liquid to enter the tray and $MM^1$ denotes the outlet for the liquid to leave the tray. On the right side of the outlet, the liquid leaves the tray after a stay on the tray for 7-odd seconds, while on the left side of the outlet, the residence time for the liquid on the tray exceeds 12 seconds. The non-uniformity of the distribution curves indicates the non-uniformity of the liquid flow distribution. The non-uniformity of the liquid flow distribution on the tray decreases the tray efficiency by 3%–8%; a serious non-uniformity even decreases the efficiency of the tray by more than 10%. The curves in FIG. 5(b) were obtained when the directing slot and directing baffle according to the present invention were installed and the distribution of the liquid residence time is comparatively uniform. It can be seen from the figure that all the liquid leaves the tray after a stay for 11 seconds. This distribution is close to an ideal one, i.e., a plug flow one, and therefore both the hydrodynamic property and the mass transfer efficiency are rather good. From the comparison between FIG. 5(a) and FIG. 5(b), it can be seen that it is beneficial to the improvement of the initial distribution of the liquid to install the directing slot and directing baffle at the inlet when the liquid to install the directing slot and directing baffle at the inlet when the liquid just enters.

The present invention provides the following positive effects:

1. Because the rectangular suspending downcomer directing tray of the present invention has directing baffles (4) and directing slots (5) installed on the rectangular downcomer directing tray (MD Tray), it retains the feature of high throughput, in addition, a comparatively high efficiency is ensured due to the existence of the directing baffle and directing slot which allow a uniform distribution of the liquid on the tray. Meanwhile, since the directing slot (5) of the present invention is positioned in the liquid receiving zone, on the one hand, impact weeping from the adjacent tray above is prevented and on the other hand, the descending liquid is guided into the bubbling zone.

2. The bubbling area of the suspending rectangular downcomer is 10%–15% larger than that of the immersed downcomer, but when the liquid drips from the bottom opening of the downcomer onto the liquid receiving zone of the tray below, local impact weeping would arise because there are openings in the liquid receiving zone and the vapor also bubbles through these openings. The result of the impact weeping is that part of the liquid from the downcomer of the adjacent tray above would directly enter the downcomer of the present tray, i.e., shortcut of partial liquid occurs. Tilted directing slots instead of vertical slots in the liquid receiving zone may prevent impact weeping and shortcut of the liquid. The experiment shows that the separation efficiency of the tray with directing slots is 5%–8% higher than that of the tray with vertical sieve openings.

3. The weakness of low efficiency of the ordinary rectangular suspending downcomer tray is overcome by using the directing component. Therefore, the efficiency of the rectangular downcomer directing tray of the present invention is equal to or slightly higher than that of the ordinary arched downcomer tray. Thus, the tray of the present invention is able to compete with the ordinary arched downcomer tray by making full use of its advantage of high throughput.

What is claimed is:

1. In a vapor-liquid contacting tower, which comprises multiple trays having multiple openings and multiple rectangular downcomers, wherein said trays are spaced from each other in the vertical direction and said rectangular downcomers are arranged in parallel and extended downwards from each tray; the angle between the downcomers on two adjacent trays is 90 degrees, each downcomer has multiple openings at its bottom, the end of which is located close to and above the adjacent tray below; the liquid flows downwards onto a liquid receiving zone of the adjacent tray below through the bottom openings of the downcomer, then traverses the tray, and arrives at an overflow weir of the downcomer of the tray; the vapor flows upwards through the openings of each tray, bubbles up through a liquid layer and forms a bubbling zone, and thereby mass transfer occurs between the vapor and liquid, the improvement comprising:

at least a pair of directing slots and at least a pair of directing baffles installed under the bottom openings of the downcomer of the adjacent tray above and on the receiving zone of the present tray;

wherein the directing slot is tilted and heaved up from the tray and located at the center of the liquid receiving zone; the directing baffle is an arced strip fixed on the tray and is located at the outside of the directing slot and close to the edge of the liquid receiving zone; and the directing slot guides the liquid in the liquid receiving zone towards both sides of the tray, the guided liquid is turned by 90 degrees by the directing baffle, and thereby flows across the bubbling zone of the tray more uniformly and steadily.

2. A vapor-liquid contacting tower according to claim 1, wherein said trays of said tower lie in respective horizontal planes and wherein the angle of said directing slot from the horizontal is 5–15 degrees.

3. A vapor-liquid contacting tower according to claim 1, wherein said directing slots are notched and wherein the number of notches of said directing slot in the liquid receiving zone is the same as those in the bubbling zone of the tray.

4. A vapor-liquid contacting tower according to claim 1, wherein the curvature of said arced strip is substantially equal to the maximum radius for turning the liquid by 90 degrees to flow across the tray.

* * * * *

UNITED STATES PATENT AND TRADEMARK OFFICE
CERTIFICATE OF CORRECTION

PATENT NO.    : 6,299,146 B1
DATED         : October 9, 2001
INVENTOR(S)   : Yu et al.

It is certified that error appears in the above-identified patent and that said Letters Patent is hereby corrected as shown below:

Drawings,
Drawing sheet 1 of 3, and substitute therefor the Drawing Sheet, consisting of figure 1, as shown on the attached page.

Column 1,
Line 46, the word "downeomer" should read -- downcomer --

Column 3,
Line 5, the word "try" should read -- tray --

Column 4,
Line 2, delete the words "so as to" and substitute the words -- is notched at the --

Signed and Sealed this

Fourth Day of February, 2003

JAMES E. ROGAN
*Director of the United States Patent and Trademark Office*